Sept. 10, 1940.   L. W. FRANKLEY   2,214,195
FLOW CONTROL MEANS
Filed March 27, 1939
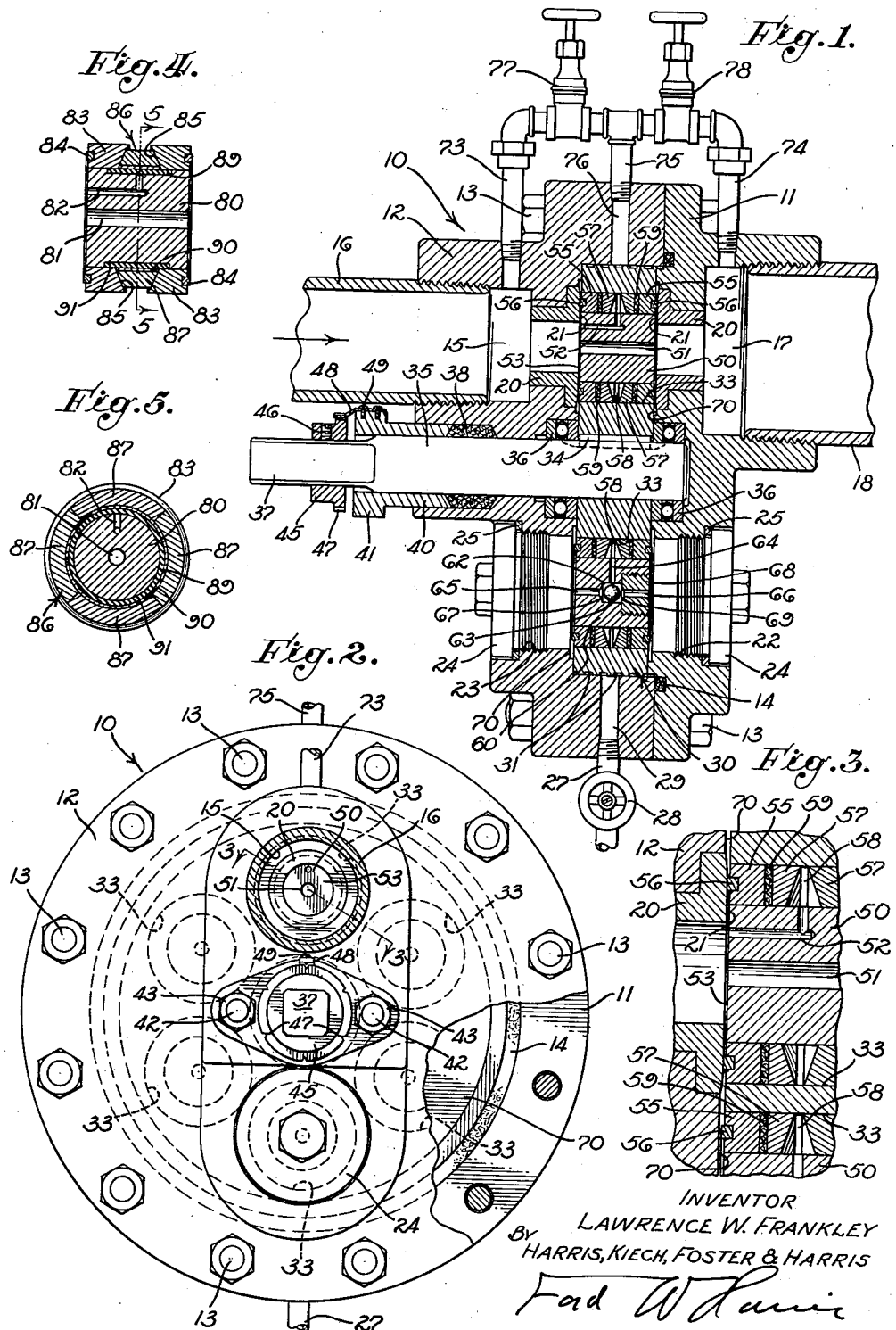
INVENTOR
LAWRENCE W. FRANKLEY
BY HARRIS, KIECH, FOSTER & HARRIS
FOR THE FIRM
ATTORNEYS.

Patented Sept. 10, 1940

2,214,195

UNITED STATES PATENT OFFICE 2,214,195

FLOW CONTROL MEANS

Lawrence W. Frankley, Hermosa Beach, Calif., assignor to Frankley-Smith Mfg. Co., Torrance, Calif., a corporation of California Application March 27, 1939, Serial No. 264,370

5 Claims. (Cl. 251—84)

My invention relates to fluid control devices, with special reference to valves, flow-beans, and the like, that have passage or orifice walls of relatively short life or requiring servicing from time-to-time.

In many practices valves and other control devices are employed for fluids that abrade or fluids that chemically attack orifice walls in the control devices to such an extent that frequent renewal or replacement of wall members is necessary. For example, in the oil well art control devices for sand-laden oil or for rotary mud laden with drilling debris are subject to such concentrated wear wherever the flow is restricted by orifices in the control devices, that it is common practice periodically either to replace the control devices bodily or to replace orifice members in the control devices. It is possible, of course, to provide duplicate control devices for alternate employment to avoid the necessity for completely cutting off flow during servicing periods, but there is a well recognized need for a single control device that will permit such servicing without cessation of flow over the time interval of servicing, and this need is extremely difficult to meet if the fluid passing through the device is under relatively high pressure.

The general object of my invention is to improve upon the construction disclosed in my co-pending application Serial No. 234,207, filed October 10, 1938, entitled "Fluid control device". The construction to which both my prior application and my present application are directed is characterized by a housing with fluid ports and a service port, in which housing is mounted a manually movable body having a plurality of flow passages arranged to be moved selectively into communication with the fluid ports or the service port, the flow passages being so spaced that while one passage is employed as a fluid channel another passage is accessible through the service port for any attention that may be needed. To prevent the flow of fluid to the service port during a servicing period, the construction includes sealing means responsive to and actuated by pressure from the fluid controlled by the device.

The present invention is particularly concerned with the construction of the fluid-pressure-responsive sealing means and two important objects of the invention are: First, to provide a reliable and highly efficient sealing means of simple construction that may be readily replaced through the service port as required; and, second, to solve the problem of providing such a sealing means without incurring excessive resistance to the mechanical movement for shifting fluid flow from one flow passage to another. That problem involves certain difficulties, since the sealing pressure necessarily is exerted against surfaces that must be moved relative to the sealing means in shifting from one fluid passage to another. If the sealing means clings tenaciously to the coacting surface or functions as an effective brake to prevent relative movement of that surface, the device may become inoperative to the extent of preventing the substitution of one flow passage for another. In my present approach to this problem, I have in mind the following objects, not all of which are indispensable to the solution. I propose to employ sealing material having minimum inherent tendency to cling to the relatively movable surfaces, to minimize the areas of contact with such relatively movable surfaces, to minimize if not eliminate frictional contact by the sealing means during the periods in which such relative movement occurs, to by-pass pressure around the sealing means to approach equalization of pressure thereon when such relative movement is to occur, and to by-pass the fluid stream while the fluid passages are being shifted, thereby to avoid absolute cessation of flow with consequent excessive pressure against one side of the control body.

In some practices of my invention wherein the device is required to cut off flow and to withstand high pressure from either direction a certain problem arises in that the sealing means involved must be responsive to pressure from either direction and the pressure ducts for conveying pressure to the sealing means from the opposite direction must be designed to preclude flow from one side of the control body to the other. In my present disclosure, therefore, one object is to provide cut-off sealing means responsive to fluid pressure from either side of the device without defeating my intention to preclude flow through the device.

The above and other objects and advantages of my invention will be apparent in my detailed description to follow, considered with the accompanying drawing.

In the drawing:

Fig. 1 is an axial section through the device;

Fig. 2 is a side elevation of the device with certain portions broken away;

Fig. 3 is a fragmentary section on an enlarged scale taken as indicated by the line 3—3 of Fig. 2;

Fig. 4 is an axial section through an alternative sealing construction that may be employed in the invention; and Fig. 5 is a transverse section taken as indicated by the line 5—5 of Fig. 4.

The drawing shows, by way of example, a construction that may be employed for controlling high-pressure flow from an oil well. The device includes a housing generally designated 10 that is formed in two complementary sections 11 and 12 held together by a series of bolts 13. Preferably a packing ring 14 seals the joint between the two sections. The housing 10 has an inlet port 15 threaded to receive an inlet pipe 16, an outlet port 17 on the opposite side of the device threaded to receive an outlet pipe 18, these two fluid ports being, by preference, in axial alignment with each other. Liners 20 in the form of removable inserts to be regarded as part of the housing 10 are inserted in each of the ports 15 and 17 to protect the inner walls thereof, the inserts being flanged not only for anchorage but also to provide suitably extensive annular sealing faces 21. The housing 10 also provides at least one service port, preferably two service ports 22 and 23 in axial alignment with each other. Normally each of these service ports is closed by a suitable plug 24 that is flanged to compress a sealing gasket 25, and in the preferred form of my invention the inner end of each plug 24 provides a smooth wall substantially in the plane of the corresponding inner wall of the housing. At the under side of the housing a small drainage pipe 27 controlled by a drainage cock 28 is threaded into a suitable drainage passage 29.

The valve housing 10 provides a circular chamber or seat to retain a complementary rotary control body 30, the control body having the configuration of a disc and being provided with circumferential grooves 31 to permit sand to work around the periphery towards the drainage passage 29. It is contemplated that the control body 30 will have a plurality of apertures or flow passages 33 that may be carried by rotation of the body either to an effective position registering with the two fluid ports 15 and 17 or to a position accessible through the service ports 22 and 23, there being six such flow passages in the specific embodiment shown in the drawing. It is further contemplated that the flow passages 33 in the control body 30 will be so located and spaced apart with respect to the locations of the fluid ports 15 and 17 and the service ports 22 and 23 that one of the passages 33 will be in a position to pass fluid between the two fluid ports, while simultaneously a second passage 33 will be accessible through one of the service ports 22 and 23, whereby one of the passages may be serviced while fluid is flowing through the valve in the normal manner.

The control body 30 may be adapted for manual rotation in any suitable manner. For example, as shown in the drawing, the rotary control body 30 may be splined by a key 34 to a spindle 35 that is mounted in two roller bearings 36 and terminates in an external square head 37. The spindle 35 extends through a suitable body of packing 38 that is retained in compression around the spindle by a suitable gland member 40. The gland 40 has a flanged head 41 that is apertured to receive a pair of studs 42 extending outwardly from the housing 10 and is pressed towards the housing by nuts 43 on the two studs.

Since the passages 33 are concealed in the housing 10, it is desirable to provide some means on the exterior of the housing to indicate when one of the passages 33 is properly registered with the fluid ports 15 and 17. Such an index means may include an index bushing 45 non-rotatably mounted on the spindle 40 and secured in place by a setscrew 46. The periphery of the index bushing 45 is provided with six V-shaped notches 47 corresponding to the six passages 33 in the control body 30, and a small flexible finger 48 of spring steel mounted on the gland 40 by suitable screws 49 is positioned to engage the notches 47 when the corresponding flow passages 33 are accurately positioned in alignment with the two fluid passages 15 and 17.

At least some of the flow passages 33 of the control body 30 retain and are protected by removable orifice members, and to permit one orifice member to be serviced while another orifice member is in use at least two of the passages 33 will be so equipped. In some practices of my invention the orifice members will be simply liners to be replaced when sufficiently worn to endanger the walls of the passages 33. In other practices of my invention the removable orifice members will be flow-beans with restricted internal diameters having the primary function of controlling fluid flow.

In the drawing I show an orifice member 50 in the form of a flow-bean having a restricted axial passage 51. It is important to note that each of the orifice members is to be dimensioned to pass freely through the service ports 22 and 23, but must be larger in outside diameter than the inner diameters of the fluid-passage inserts 20 so that the two inserts serve to confine whatever orifice member registers with the fluid passages 15 and 17. Since the orifice member is surrounded by a fluid-pressure-responsive sealing means, it is necessary to provide a passage for conveying pressure to such sealing means. Such a passage, of course, may be provided in the control body 30, but I choose to form the passage in the removable orifice member 50, and in the preferred form of my invention this passage or pressure duct, as shown at 52 in Figs. 1 and 3, extends inwardly from the upstream face 53 of the orifice member, thereby receiving maximum pressure.

For sealing off each end of a flow passage 33 while such flow passage is in use, I mount on each end of the orifice member 50 a sealing ring 55 having an annular channel to receive an insert ring 56 of suitable sealing material. For high pressure installations, I prefer to make the inserted ring 56 of relatively hard material, such as Bakelite, steel, bronze, and the like, because I have found that such material will provide an efficient seal and yet may be relatively narrow in cross-sectional dimension to minimize the areas under sealing pressure. Since the sealing means acts between the movable control body 30 and the surrounding walls of the housing 10, or, more specifically, acts against the sealing faces 21 of the inserts 20 in the housing, it is necessary that the sealing means function in a releasable manner with respect to the sealing surfaces of the housing to permit relative movement between the control body and the housing when it is desired that one flow passage 33 be substituted for another at the fluid passages 15 and 17 of the housing. I have found that relatively hard sealing rings 56 having narrow sealing faces will, when relieved of pressure, readily permit relative movement between the rings 56 and the coacting sealing faces 21 presented by the inserts 20.

For the purpose of subjecting the sealing ring 55 to pressure for forcing the circular inserts 56 against the sealing faces 21, I provide a pair of follower rings 57 slidingly embracing the orifice member 50 inside the two rings 55 and I arrange for fluid pressure from the pressure duct 52 to be exerted between these two follower rings. By making the opposed faces of the follower rings 57 conical in configuration, I insure the presence of an annular pressure space or chamber 58 around the orifice member even when the two follower rings are closed together. It is apparent that by virtue of this arrangement, pressure transmitted to the sealing means through the pressure duct 52 and acting against the follower rings 57 will cause the sealing inserts 56 to be pressed against the corresponding sealing faces 21, the sealing pressure varying with the pressure of the fluid on the upstream face of the orifice member 50.

To effectively seal off the fluid passage 33 in operation from the sealing ports 22 and 23 to the end that either of the service port plugs 24 may be removed without releasing a fluid stream from the device, it is necessary to provide further sealing means to cut off any fluid flow from the annular pressure space 58 past the outer periphery of the sealing rings 55. In the preferred form of my invention shown in Fig. 1, I provide such an additional seal by inserting a packing ring 59 between each of the follower rings 57 and the corresponding sealing ring 55, the interposed packing ring being fabricated from leather or other suitable material that is deformable to the required extent under pressure. It is apparent, then, that the sealing means surrounding the orifice member comprises two sets of rings that are forced apart by fluid pressure to provide sealing action and that the sealing action occurs not only between the control body 30 and the housing 10 around each of the fluid passages 15 and 17, but also between the orifice member 50 and the surrounding walls of the flow passage 31. In this latter sealing action, the packing rings 59 under pressure from the follower rings 57 expand both radially outward against the surrounding walls of the flow passage 33 and also expand radially inward against the periphery of the orifice member 50.

It is to be noted that the force which drives each of the sealing rings 55 axially outward for sealing engagement with the walls of the housing 10 is derived from the relatively high fluid pressure acting on the full cross-sectional areas of the sealing rings. Although, in the construction shown, the high pressure fluid also has access to the outer faces of the sealing rings to oppose the sealing action, the exposed areas of the outer faces are relatively small. The inserted rings 56 serve to limit the areas of the outer faces of the rings that are exposed to the high pressure fluid and thus ensure an area differential favoring the sealing action.

In some installations of a fluid control device of the type shown in Fig. 1, it is desirable that the device cut off fluid flow through the device completely at one position of the control body 30, and since it may be desirable to service one of the flow passages 33 while the control body is in the cut-off position, it is further desirable that some sealing means be effective at such time to prevent fluid from being released to one of the service ports 22 or 23 when the corresponding service plug is removed. In my copending application heretofore identified, I show such a sealing means responsive to fluid pressure from the intake side of the device when the control body is at a position cutting off fluid flow through the device. My present invention includes such a sealing means that is arranged for actuation in response to fluid pressure from either the upstream side or the downstream side of the device according to the direction of preponderant pressure. Such a sealing construction has special utility in a line for circulating rotary mud in a well, because, after mud flow is cut off, back pressure from the downstream side of the device may exceed the normally preponderant pressure from the upstream side.

It will be apparent to those skilled in the art that the rotary body 30 may be adapted to cut off flow between the fluid passages 15 and 17 if the control body has simply a blank portion movable into a position blocking the two fluid passages. In the preferred form of my invention shown in the drawing, however, I employ a cylindrical cut-off plug 60 of substantially the same outside diameter as the previously described orifice member 50. Surrounding the cut-off plug 60 in the flow passage 33 in which it is mounted are the two sets of sealing rings previously described, which sealing rings function in response to fluid pressure.

In the interior of the cut-off plug 60 is a check-valve chamber 62 that loosely confines a valve member in the form of a ball 63. A pressure duct 64 extends outward from the check-valve chamber 62 to the annular pressure space 58 for actuating the sealing means in the manner heretofore described. The pressure in the check-valve chamber 62 that is transmitted through the pressure duct 64 may be transmitted thereto through either of two longitudinal pressure ducts 65 and 66 that lead to the check-valve chamber from the opposite faces of the cut-off plug. The longitudinal pressure duct 65 is a bore in the cut-off plug that terminates in a suitable valve seat 67 for the ball 63 in the check-valve chamber 62. The longitudinal pressure duct 66 is provided by a bushing 68, the inner end of the bushing forming a second valve seat 69 for the ball 63.

When the cut-off plug 60 is moved to a position to cut off flow between the inlet port 15 and the outlet port 17, normally the preponderance of pressure will be from the upstream side of the cut-off plug and such pressure acting through the pressure duct 65 will force the ball 63 against the seat 69 cutting off the pressure duct 66 that leads to the downstream face of the cut-off plug. Should the direction of pressure preponderance be reversed, however, the ball 63 will be automatically shifted to a position cutting off the pressure duct 65, and the fluid pressure for actuating the sealing means embracing the cut-off plug will be conveyed thereto through the pressure ducts 66 and 64.

Ease of rotation on the part of the control body 30 is not readily attained in high pressure installations. I have previously referred to the fact that such ease of rotation must be kept in mind in designing the sealing means that embraces each of the orifice members, but further expedients are desirable to facilitate rotation of the control body when the fluid pressure is exceedingly high. One of these expedients is the recessing of the inner walls of the housing 10 on either side of the control body 30 to provide two annular clearance channels 70 conforming to the circular paths taken by the various sets of sealing rings when the control body is rotated. When such clearance channels 70 are provided, the inserts 20 that are employed are slightly conical at their outer edges for smooth transition from the clearance channels 70 to the portions of the sealing faces 21 against which the sealing rings normally exert pressure. By virtue of this construction, the sealing means associated with the various fluid passages 33 may be substantially out of contact with the walls of the housing 10 except when they are moved into the vicinity of the fluid ports 15 and 17 of the housing. Whenever the control body is rotated to shift the fluid passages, one annular sealing means comprising two sets of rings slides off the corresponding sealing faces 21 of the inserts 20 and the succeeding two sets of sealing rings move into contact with the sealing faces 21. During such movement the new sets of sealing rings are progressively confined axially, but the annular sealing means of the other four flow passages 33 incur substantially no frictional resistance to rotation of the control body. It will be noted that the service port plugs completely fill the service ports, as heretofore mentioned, and prevent any of the annular sealing means or orifice members from catching on the edges of the service ports when the control body is rotated.

Another expedient for facilitating rotation of the control body consists in by-passing fluid pressure temporarily around the sealing means to approach equalization of pressure against the various surfaces of the sealing means and thereby reduce the sealing pressure exerted against the sealing faces 21. Temporary by-passing of pressure for this purpose is permissible so long as the service ports 22 and 23 are closed during the by-passing interval. In the embodiment of my invention shown in the drawing, a pipe 73 from the inlet port 15 and a second pipe 74 from the outlet port 17 are connected to an equalization pipe 75 that is threaded into an equalization bore 76 through the housing 10 to the periphery of the control body 30. The pipe 73 is controlled by an equalization valve 77 and the pipe 74 is likewise controlled by an equalization valve 78 so that pressure for equalization may be transmitted to the bore 76 from either of the fluid ports 15 and 17 by opening the corresponding equalization valve 77 or 78, the other equalization valve being closed. When the described equalization arrangement is ineffective because both of the valves 77 and 78 are closed, the outer faces of the sealing rings 55 outside the circle formed by the sealing inserts 56 are not subjected to relatively high pressure in opposition to pressure in the annular pressure space 58; when one of the valves 77 or 78 is open to make the equalization arrangement effective, however, equalization pressure is exerted against the described portions of the sealing rings 55 in opposition to pressure of the sealing insert 56 against the sealing faces 21 is materially reduced.

If, in the course of shifting the fluid passages that register with the ports 15 and 17, the control body 70 takes a position at which it cuts off flow entirely between the two ports, the resultant exceedingly high pressure on the upstream face of the rotary body may cause the rotary body to bind or to exert such pressure against the housing 10 as to make such movement extremely difficult. As a further expedient for facilitating rotation of the control body, then, I have the conception of by-passing the fluid flow between the passages 15 and 17 completely around the control body 30. A feature of the structure already described is that such by-passing of fluid may be provided whenever necessary by simply opening both of the equalization valves 77 and 78 whereupon fluid will flow from the intake port 15 through the pipes 73 and 74 to the outlet port 17.

In the form of the invention shown in Fig. 1, each of the orifice members 50 and the associated sets of sealing rings may be termed an "orifice assembly" that is expansile in opposite directions to provide a seal in response to fluid flowing through the device. In Figs. 4 and 5 I show a second orifice assembly that may be substituted in Fig. 1 if so desired. In this second orifice assembly, the orifice member 80 is similar in construction to the previously described orifice member 50 having a similar axial passage 81 and a similar pressure duct 82. Embracing each end of the orifice member 80 is a sealing ring 83 carrying a circular sealing insert 84 corresponding to the sealing insert 56 of Fig. 1. Each of the sealing rings 83 has a conical inner face 85 to coact with a complementary wedge ring 86 that is interposed between the two rings 83 and is adapted to force the rings 83 apart by radial movement. The wedge ring 86 may be made of relatively elastic material to expand radially, but I prefer to form the wedge ring of relatively hard material such as metal, and to split the wedge ring to permit the required radial movement in response to radial pressure from within the wedge ring. The wedge ring 86 may be split only once, but I prefer to form the wedge ring by four independent segments 87, as best shown in Fig. 5.

Embracing the orifice member 80 is an expansile sleeve 89 of rubber or other suitable material, the sleeve being of sufficient longitudinal extent to extend across the joints between the wedge ring 86 and the adjacent sealing rings 83. Fluid pressure transmitted through the pressure duct 82 to the inner annular surface of the sleeve 89 causes the sleeve to press radially outward against the wedge ring 86, thereby causing radial movement of the wedge ring to force the two sealing rings 83 apart, whereby the desired sealing action is accomplished. It will be noted that the sleeve 89 seals the joints between the rings 83 and the intermediate wedge ring 86 and thereby serves the function of the two packing rings 59 in Fig. 1. When the wedge ring 86 is expanded, spaces are formed between the normally abutting ends of the segments 87. To keep the material of the sleeve 89 from being forced into the spaces between the segments 87, I may provide a relatively thin split band 90 of spring steel to serve as an expansile liner for the wedge ring 86. In the particular construction shown in Figs. 4 and 5 the orifice member 80 is provided with a peripheral channel 91 to receive the sleeve 89, but instead of cutting such a channel in the orifice member, space for the sleeve 91 may be provided by cutting away the inner annular walls of the sealing rings 83. The manner in which my device operates may be readily understood from the foregoing description. In the normal use of the arrangement shown in Fig. 1, an orifice member 50 is in a position to transmit fluid from the inlet port 15 to the outlet port 17 and the fluid-pressure-actuated sealing means around the orifice member effectively cuts off the fluid from migration to other parts of the housing interior. When the operator desires to shift the fluid flow through the device from one of the orifice members to another, he first makes sure that the drain cock 28 is closed and then opens the equalization valve 77 to by-pass pressure from the inlet port 15 to the major portion of the housing interior that is normally cut off by the sealing means around the orifice member. The operator then applies a wrench to the square head 37 on the end of the spindle 35 and rotates the spindle until the index finger 48 registers with the notch 47 corresponding to the desired flow passage of the control body. If such movement of the control body completely cuts off flow through the device and the consequent rise in pressure on the upstream side makes movement of the control body 30 difficult, the second equalizing valve 78 may be opened to permit the fluid to by-pass the control body until the next orifice member is brought into operative position. After the desired shift has been accomplished, both the equalizing valves 77 and 78 are closed and the drain cock 28 may then be opened to reduce the pressure in the housing outside of the sealing means that is in operation. Normally, opening of the drain cock at such time will cause a momentary discharge of fluid from the housing, which discharge of course will carry sand away from the periphery of the control body 30. If the discharge of fluid through the drain cock continues, failure of the sealing means is indicated.

For servicing one of the flow passages 33 while the device is in use and is subject to high fluid-pressure, the operator first takes the precaution of seeing that the drain cock is open to be sure that the interior of the housing is not under pressure. The operator then removes either one or both of the plugs 24 that normally close the service ports 22 and 23. If both the plugs are removed the orifice assembly may be dislodged from the exposed flow passage 33 by delivering blows against one face of the orifice assembly through one of the service ports to force the orifice assembly out of the housing through the other service port. A new orifice member or new sets of sealing rings may then be substituted as desired.

The specific embodiment of my invention described in detail herein for the purpose of disclosure and to illustrate the principles involved will suggest to those skilled in the art various changes, modifications, and substitutions that do not depart from my inventive concept. For example, the movement of the control body 30 in shifting flow from one flow passage 33 to another need not necessarily be circular movement, since the control body may be designed to shift in a straight line from one operative position to another, if desired. I reserve the right to all such modifications that come within the scope of my appended claims.

I claim as my invention:

1. A fluid control device comprising: a housing having two fluid ports and a service port; closure means for said service port; a manually movable body mounted in said housing between said fluid ports and having a plurality of flow passages to be used selectively for communication between said fluid ports, said flow passages being so spaced that when one passage is in position to transmit fluid between said fluid ports, another of said flow passages is accessible through said service port whereby one of said flow passages may be serviced while fluid is flowing through another of said passages, said body being adapted at one position to cut off flow between said fluid ports; fluid-pressure-responsive sealing means in at least one of said flow passages for sealing movement in opposite directions to seal off said passage and said fluid ports from said service port when said flow passage is in effective position, there being a pressure duct to convey pressure to said sealing means from fluid passing through the device; fluid-pressure-responsive sealing means to act between said body and housing to seal off said fluid ports when said body is at said cut-off position, there being two pressure ducts from opposite sides of said body to said sealing means; and check-valve means to cut off either of said pressure ducts in response to fluid pressure in the other to prevent fluid flow from one side of said body to the other through said pressure ducts.

2. A fluid control device comprising: a housing having a service port and two fluid ports; closure means for said service port; a manually movable body mounted in said housing between said fluid ports and having a plurality of flow passages to be used selectively for communication between said fluid ports, said flow passages being so spaced that when one passage is in position to transmit fluid between said fluid ports, another of said passages is accessible through said service port whereby one of said passages may be serviced while fluid is flowing through another of said passages; an orifice member removably mounted in at least one of said flow passages for replacement through said service port; a fluid-pressure-responsive sealing means surrounding said orifice member in said flow passage for sealing movement in opposite directions to seal off said flow passage and fluid ports from said service port when said flow passage is in effective position, there being a pressure duct to convey pressure to said sealing means from fluid passing through the device; a cut-off plug removably mounted in a second of said flow passages; a second fluid-pressure-responsive sealing means surrounding said plug in said second passage for sealing movement in opposite directions to seal off said fluid ports from said service port, there being two pressure ducts in said plug from opposite sides of said body to said second sealing means for actuation thereof; and means to cut off either of said pressure ducts in response to fluid pressure in the other to prevent fluid flow from one side of said body to the other through said pressure ducts.

3. A fluid control device comprising: a housing having a service port, an inlet fluid port, and an outlet fluid port; closure means for said service port; a manually movable body mounted in said housing between said fluid ports and having a plurality of flow passages to be used selectively for communication between said fluid ports, said flow passages being so spaced that when one passage is in effective position to transmit fluid between said fluid ports, another of said flow passages is accessible through said service port, whereby one of said flow passages may be serviced while fluid is flowing through another of said passages; tubular orifice members removably mounted in at least some of said flow passages for replacement through said service port; and two sets of rings around each of said orifice members forming fluid-pressure-responsive sealing means for sealing pressure in opposite directions against the wall of said housing, there being a pressure duct to convey actuating pressure to each of said sealing means from fluid passing through the device, each of said sets of rings including a relatively soft ring subject to axial compression for radially inward and radially outward sealing pressure.

4. A fluid control device comprising: a housing having a service port, an inlet fluid port, and an outlet fluid port; closure means for said service port; a manually movable body mounted in said housing between said fluid ports and having a plurality of flow passages to be used selectively for communication between said fluid ports, said flow passages being so spaced that when one passage is in effective position to transmit fluid between said fluid ports, another of said flow passages is accessible through said service port, whereby one of said flow passages may be serviced while fluid is flowing through another of said passages; tubular orifice members removably mounted in at least some of said flow passages for replacement through said service port; and two sets of rings around each of said orifice members forming fluid-pressure-responsive sealing means for sealing pressure in opposite directions against the wall of said housing, there being a pressure duct to convey actuating pressure to each of said sealing means from fluid passing through the device, each of said sets of rings including an outer sealing ring for sealing contact with the wall of said housing, a relatively soft ring, and a follower ring to exert axially outward pressure against said outer ring and relatively soft ring.

5. A fluid control device comprising: a housing having a service port, an inlet fluid port, and an outlet fluid port; closure means for said service port; a manually movable body mounted in said housing between said fluid ports and having a plurality of flow passages to be used selectively for communication between said fluid ports, said flow passages being so spaced that when one passage is in effective position to transmit fluid between said fluid ports, another of said flow passages is accessible through said service port, whereby one of said flow passages may be serviced while fluid is flowing through another of said passages; tubular orifice members removably mounted in at least some of said flow passages for replacement through said service port; two rings embracing each of said orifice members; and an annular means embracing each of said orifice members between said two rings, said annular means being radially expansile in response to fluid pressure to force said rings axially away from each other by a wedge action, there being a pressure duct to convey actuating pressure to each of said annular means from fluid passing through the device.

LAWRENCE W. FRANKLEY.